US008223159B1

(12) United States Patent
Diard et al.

(10) Patent No.: US 8,223,159 B1
(45) Date of Patent: Jul. 17, 2012

(54) SYSTEM AND METHOD FOR TRANSFERRING DATA BETWEEN UNRELATED API CONTEXTS ON ONE OR MORE GPUS

(75) Inventors: Franck R. Diard, Mountain View, CA (US); Barthold B. Lichtenbelt, Fort Collins, CO (US); Mark J. Harris, London (GB); Simon G. Green, London (GB)

(73) Assignee: NVIDIA Corporation, Santa Clara, CA (US)

( * ) Notice: Subject to any disclaimer, the term of this patent is extended or adjusted under 35 U.S.C. 154(b) by 476 days.

(21) Appl. No.: 11/471,154

(22) Filed: Jun. 20, 2006

(51) Int. Cl.
*G06T 1/00* (2006.01)

(52) U.S. Cl. ........ 345/522; 345/502; 345/505; 345/506; 345/520

(58) Field of Classification Search .................. 345/501, 345/522, 505, 506, 520, 502; 711/122, 118, 711/128; 712/14, 16, 18, 34, 203
See application file for complete search history.

(56) References Cited

U.S. PATENT DOCUMENTS

| | | | | |
|---|---|---|---|---|
| 6,108,739 A * | 8/2000 | James et al. | .................. | 710/113 |
| 6,473,086 B1 * | 10/2002 | Morein et al. | ................. | 345/505 |
| 6,473,087 B1 * | 10/2002 | Tsang | ........................... | 345/505 |
| 6,728,820 B1 * | 4/2004 | Brian et al. | .................... | 710/306 |
| 6,789,154 B1 * | 9/2004 | Lee et al. | ....................... | 710/315 |
| 6,862,027 B2 * | 3/2005 | Andrews et al. | ............... | 345/505 |
| 6,944,720 B2 * | 9/2005 | Sperber et al. | ................ | 711/144 |
| 7,355,601 B2 * | 4/2008 | Andrews et al. | ............... | 345/505 |
| 7,383,412 B1 * | 6/2008 | Diard | ............................ | 711/170 |
| 7,739,479 B2 * | 6/2010 | Bordes et al. | ...................... | 712/1 |
| 7,895,411 B2 * | 2/2011 | Maher et al. | ....................... | 712/3 |
| 2002/0118201 A1 * | 8/2002 | Mukherjee et al. | ............ | 345/504 |
| 2003/0060898 A1 * | 3/2003 | Jenkins et al. | ..................... | 700/2 |
| 2004/0041820 A1 * | 3/2004 | Sevigny | ......................... | 345/619 |
| 2004/0042654 A1 * | 3/2004 | Sevigny | ......................... | 382/167 |
| 2004/0051716 A1 * | 3/2004 | Sevigny | ......................... | 345/589 |
| 2004/0109004 A1 * | 6/2004 | Bastos et al. | ...................... | 345/587 |
| 2004/0263519 A1 * | 12/2004 | Andrews et al. | ............... | 345/502 |
| 2005/0012749 A1 * | 1/2005 | Gonzalez et al. | ............. | 345/522 |
| 2005/0091616 A1 * | 4/2005 | Wang et al. | .................... | 715/864 |

* cited by examiner

*Primary Examiner* — Xiao M. Wu
*Assistant Examiner* — Abderrahim Merouan
(74) *Attorney, Agent, or Firm* — Patterson & Sheriday, LLP (57) ABSTRACT

One embodiment of the present invention sets forth a system configured for transferring data between independent application programming interface (API) contexts on one or more graphics processing units (GPUs). Each API context may derive from an arbitrary API. Data is pushed from one API context to another API context using a peer-to-peer buffer "blit" operation executed between buffers allocated in the source and target API context memory spaces. The source and target API context memory spaces may be located within the frame buffers of the source and target GPUs, respectively, or located within the frame buffer of a single GPU. The data transfers between the API contexts are synchronized using semaphore operator pairs inserted in push buffer commands that are executed by the one or more GPUs.

16 Claims, 6 Drawing Sheets

SYSTEM AND METHOD FOR TRANSFERRING DATA BETWEEN UNRELATED API CONTEXTS ON ONE OR MORE GPUS

BACKGROUND OF THE INVENTION

1. Field of the Invention

Embodiments of the present invention relate generally to computer graphics and more specifically a system and method for transferring data between unrelated application programming interface (API) contexts on one or more graphics processing units (CPUs).

2. Description of the Related Art

Computer graphics image data typically undergoes several processing steps before each graphics frame is completely rendered for display or storage. Each processing step typically operates on graphics image data utilizing programming steps defined through an application programming interface, enabling the graphics application to utilize high performance hardware such as a graphics processing unit (GPU) to execute a set of processing steps with minimal real-time supervision from a host CPU. For example, a graphics application executing on a host central processing unit (CPU) may use an application programming interface to program processing steps in a GPU including physics, geometric transform, polygon setup, rasterization and pixel shading, resulting in the display of graphics image frames.

As graphics applications become more sophisticated, the related processing steps are becoming more sophisticated and diverse in nature. The growing diversity of functional requirements by graphics applications results in situations where certain application programming interfaces are more suitable for certain types of processing steps relative to other application programming interfaces. However, the current art only provides for single application programming interfaces to operate on data in a single application programming interface context. The requirement that all processing steps must be defined and executed within a single application programming interface context severely limits the ability of new graphics applications to exploit the potential of newly emerging application programming interfaces.

In addition, as graphics applications begin to implement more steps with greater complexity in each step, the computational load on the GPU executing the processing steps increases, resulting in diminished overall rendering performance. One approach to improving overall processing time has been to configure multiple GPUs to concurrently process a single graphics frame or assign multiple GPUs to process alternating graphics frames. Such approaches generally involve synchronizing the GPUs to simultaneously render portions of the same frame or sequential frames to increase overall rendering performance. Again, however, in current multi-GPU systems, all of the GPUs have to specify their complete rendering pipelines within the same application programming interface and therefore cannot optimally select and utilize more suitable application programming interfaces, as needed, for each processing step.

As the foregoing illustrates, what is needed in the art is a mechanism for enabling applications to exploit different application programming interfaces when processing operations are performed on one or more GPUs.

SUMMARY OF THE INVENTION

One embodiment of the invention sets forth a system for processing data within multiple application programming interface (API) contexts. The system includes a first API and a first software driver configured to interact with the first API to generate a first API context. The first API and the first software driver are further configured to receive a first set of commands from an application and to generate a first push buffer of commands based on the first set of commands received from the application for processing a set of data within the first API context on a graphics processing unit. The system also includes a second API and a second software driver configured to interact with the second API to generate a second API context. The second API and second software driver are configured to receive a second set of commands from the application and generate a second push buffer of commands based on the second set of commands received from the application for processing the set of data within the second API context on a graphics processing unit. Commands from the second push buffer are executed on the set of data within the second API context after commands from the first push buffer are executed on the set of data within the first API context.

One advantage of the disclosed system is that it enables data to be processed within a first API context and then transferred to a second API context for further processing. The processing operations within the first API context and the second API context may occur on one or more GPUs. Thus, among other things, the present invention enables a graphics processing system to be configured with different APIs so that an application can optimally select and utilize the API(s) most suitable for a particular processing step.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

The present invention enables concurrent execution and communication between multiple, unrelated application programming interface (API) contexts under the control of a common software application. By providing a context-to-context communications mechanism, software performance and development time are both improved by allowing applications to exploit the most appropriate mix of capabilities for the specific needs of the application. Furthermore, an application's data flow and computational load may be distributed over multiple GPUs, where each GPU interacts with the application through a different API.

Figure 1:
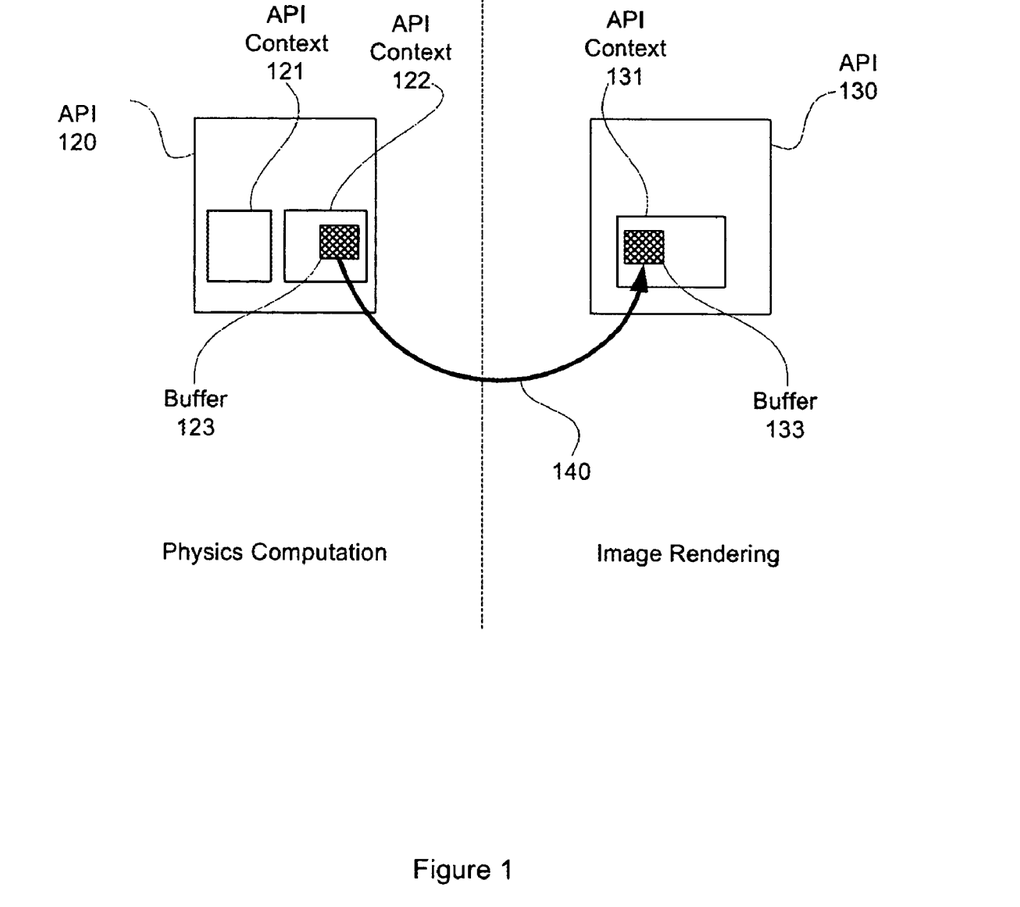
FIG. 1 is a conceptual drawing of data passing from one API context to another API context, according to one embodiment of the invention.

FIG. 1 is a conceptual drawing of data passing from one API context to another API context, according to one embodiment of the invention. As is well known, a given application may generate a set of different API contexts by executing a first set of computations under the control of one API and then executing a second set of computations under the control of a different API. An API context, in general, includes data structures and any execution state information necessary to fully represent the state of a given executing process. In situations where processing data using two different APIs is desirable, then data from a context generated under the one API needs to be transferred to a context generated under the other API. For example, a first API 120, such as OpenGL®, may be used to establish a first API context 122 to perform physics calculations in a graphics application. The first API 120 can optionally establish another API context 121 to perform rendering calculations unrelated to the API context 122. A second API 130, such as D3D®, may be used to establish a second API context 131 to perform rendering calculations based on the results of the physics calculations. Importantly, with such a structure, each portion of the graphics application pipeline is able to use the most convenient API for its respective calculations.

API context 131 includes a buffer 133, identified by the application as a destination buffer, used as a destination for data transferred from API context 122 to API context 131. For example, the results of physics calculations performed in the API context 122 (the OpenGL® context) and deposited in a local buffer 123 may be transferred into the buffer 133 within the API context 131 (the D3D® context) for graphics rendering. FIGS. 2A-5 describe systems and methods to enable this functionality.

Figure 2A:
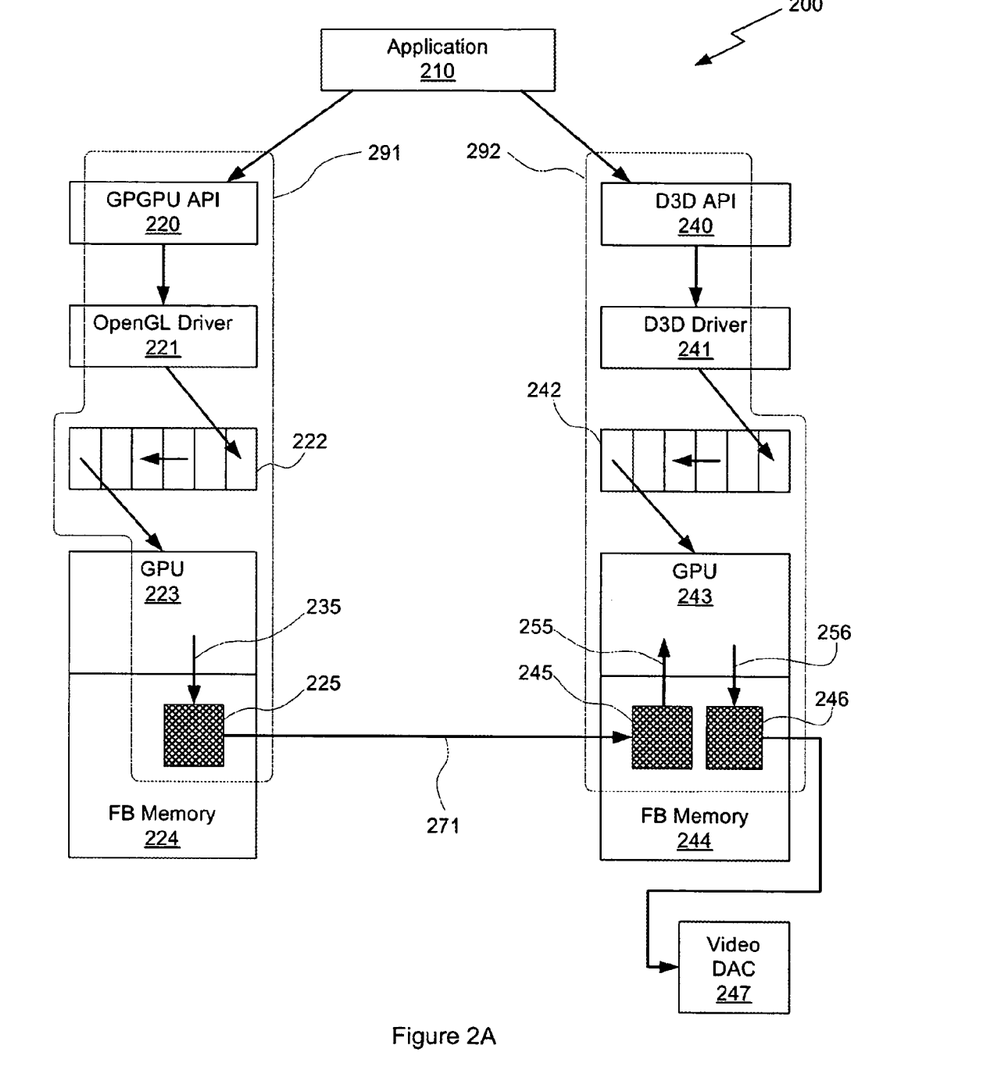
FIG. 2A is a conceptual drawing of data passing from a first API context directly to a second API context via peer-to-peer transfer, according to one embodiment of the invention.

FIG. 2A is a conceptual drawing of data passing from a first API context 291 directly to a second API context 292 via peer-to-peer transfer, according to one embodiment of the invention. A multi-API computation system 200 includes one or more APIs and an application 210 that invokes and uses the one or more APIs. As shown, the application 210 invokes an API referred to as general purpose graphics processing unit (GPGPU) API 220, which then invokes an OpenGL® driver 221. The OpenGL® driver 221 then allocates and manages a push buffer 222, through which commands to a first GPU 223 are conveyed. The application 210 also invokes a D3D® API 240, which then invokes a D3D® driver 241. The D3D® driver 241 allocates and manages a push buffer 242, through which commands to a second GPU 243 are conveyed.

Part of the initial API initialization process includes allocating all buffers to be used for API context-to-API context data transfers. Thus, the application 210 instructs the GPGPU API 220 to allocate a buffer 225 and the D3D® API 240 to allocate buffer 245 for such transfers.

Once the API initialization process has completed, the application 210 conveys processing commands to the GPGPU API 220. These processing commands, when further processed by the GPGPU API 220 and the OpenGL® driver 221, include additional commands inserted into the push buffer 222 command stream that facilitate synchronized data transfer from the first API context 291 generated under the GPGPU API 220 to the second API context 292 generated under the D3D® API 240. Similarly, the application 210 communicates processing commands to the D3D® API 240, which, when processed by the D3D® driver 241, include transfer and synchronization commands inserted into the push buffer 242 command stream that facilitate synchronized data transfers from the first API context 291 to the second API context 292.

The first GPU 223 has an attached frame buffer (FB) memory 224. The FB memory 224 includes the buffer 225 allocated to the first API context 291. Data 235 is written to Buffer 225 as a result of processing conducted on the first GPU 223 using the GPGPU API 220. The resulting data 235 stored in the buffer 225 is transferred to the second GPU 243, through a transfer operation 271. The transferred data is placed in the buffer 245, which is allocated in an FB memory 244 that is attached to the second GPU 243. The transfer operation 271 may be conducted using any technically feasible mechanism. In one embodiment, the transfer operation 271 comprises a process known in the art as a direct memory access copy operation. Such an operation is commonly referred to as a "blit", and, in this fashion, the first GPU 223 effectively "pushes" the data from the first buffer 225 to the second buffer 245. In another embodiment, the transfer operation 271 is conducted using a mechanism known in the art as PCI Express® peer-to-peer transfer. Such a transfer is conducted using a direct memory access (DMA) to facilitate efficient data transfers. As described in greater detail below in FIG. 3, the transfer operation 271 is triggered on the "source" side by a transfer data command inserted in the command stream of the push buffer 222. The transfer data command causes the first GPU 223 (i.e., the source) to transfer the result data 235 stored in the buffer 225 to the buffer 245 within the FB memory 244. As also described in greater detail below in FIG. 3, the destination transfer buffer 245 is examined by the second GPU 243 when an acquire semaphore command inserted in the command stream of the push buffer 242 indicates there is incoming data.

The second GPU 243 processes data 255 stored in buffer 245 in conjunction with the commands received from push buffer 242 to produce rendered data 256, which is then stored in buffer 246. In one embodiment, the rendered data 256 stored in buffer 246 consists of graphics frames that are scanned out to a video digital to analog converter (DAC) 247 for display.

Importantly, the architecture of FIG. 2A enables application 210 to process data within the first API context 291 using the first API, GPGPU API 220, and then transfer the processed data to the second API context 292 generated under the second API, the D3D® API 240, for further processing.

Figure 2B:
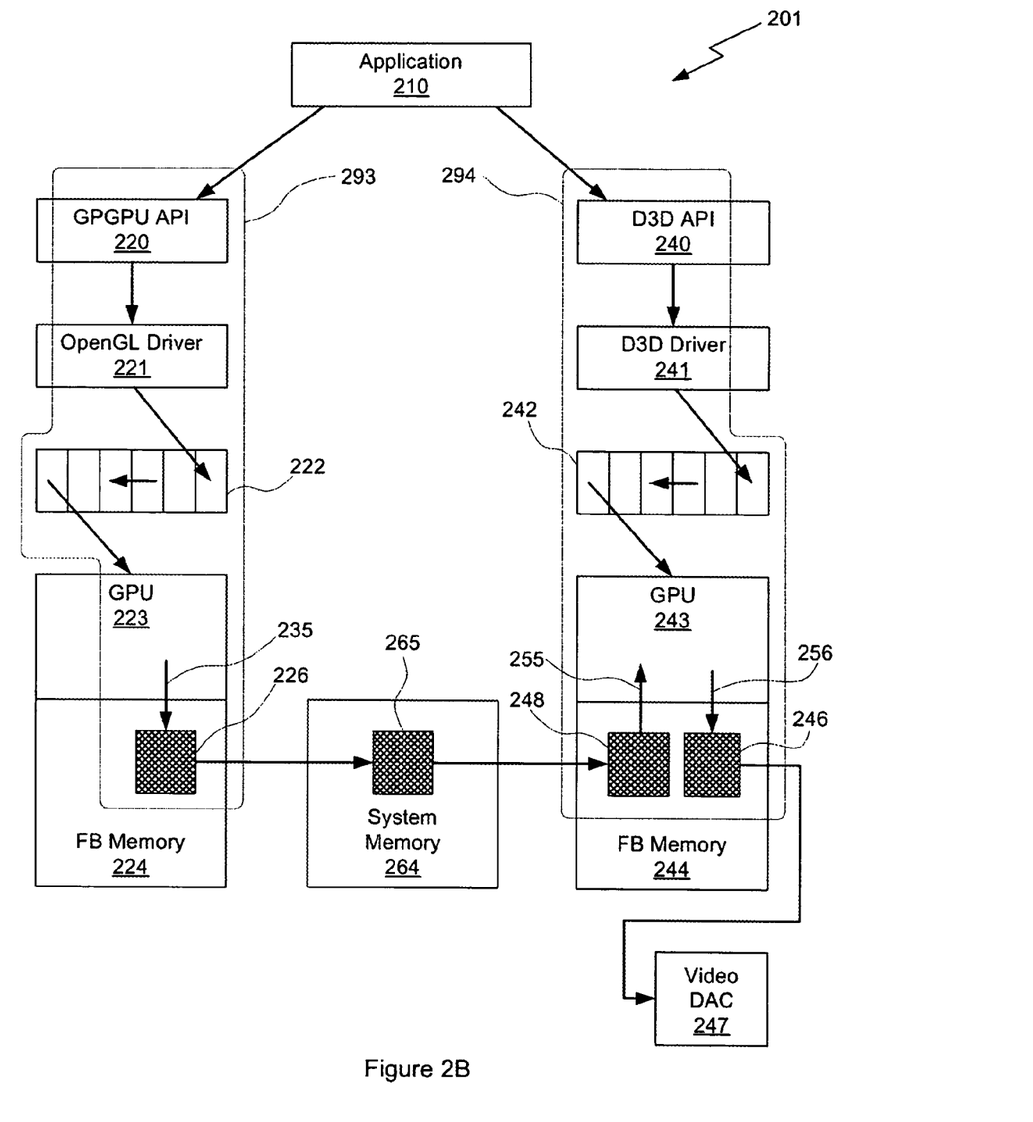
FIG. 2B is a conceptual drawing of data passing from a first API context to a second API context via shared system memory, according to another embodiment of the invention.

FIG. 2B is a conceptual drawing of data passing from a first API context 293 to a second API context 294 via shared system memory 264, according to another embodiment of the invention. The multi-API computation system 201 of FIG. 2B operates substantially identically to the multi-API computation system 200 of FIG. 2A, with the exception of the data transfers from the first GPU 223 to the second GPU 243, which involve system memory 264 as an intermediate storage location for the transferred data. System memory 264 may be used in this fashion when the particular system hosting the GPUs 223 and 243 does not support direct transfers between the FB memories 224 and 244.

As shown, a transfer command from push buffer 222 causes the first GPU 223 (i.e., the source) to transfer the data 235 stored in buffer 226 in FB memory 224 to a buffer 265 in system memory 264. When the second GPU 243 (i.e., the destination) receives a pull command from push buffer 242, the second GPU 243 transfers the buffer 265 in system memory 264 to a buffer 248 in FB memory 244. Newly received data in buffer 248 is acted upon by the second GPU 243 once an acquire semaphore command is received from push buffer 242. Again, the pull and acquire semaphore commands are described in greater detail below in FIG. 3.

System memory 264 is typically slower than FB memories 224, 244 and involving system memory 264 in the data transfer process also adds an additional buffer transfer operation, reducing overall performance. Thus, better performance is attained when the peer-to-peer transfers of FIG. 2A are directly supported by the system. However, the option of conducting transfers through system memory 264 adds flexibility and robustness to the invention described herein, especially in cases where the overall system does not support peer-to-peer transfers.

Figure 3:
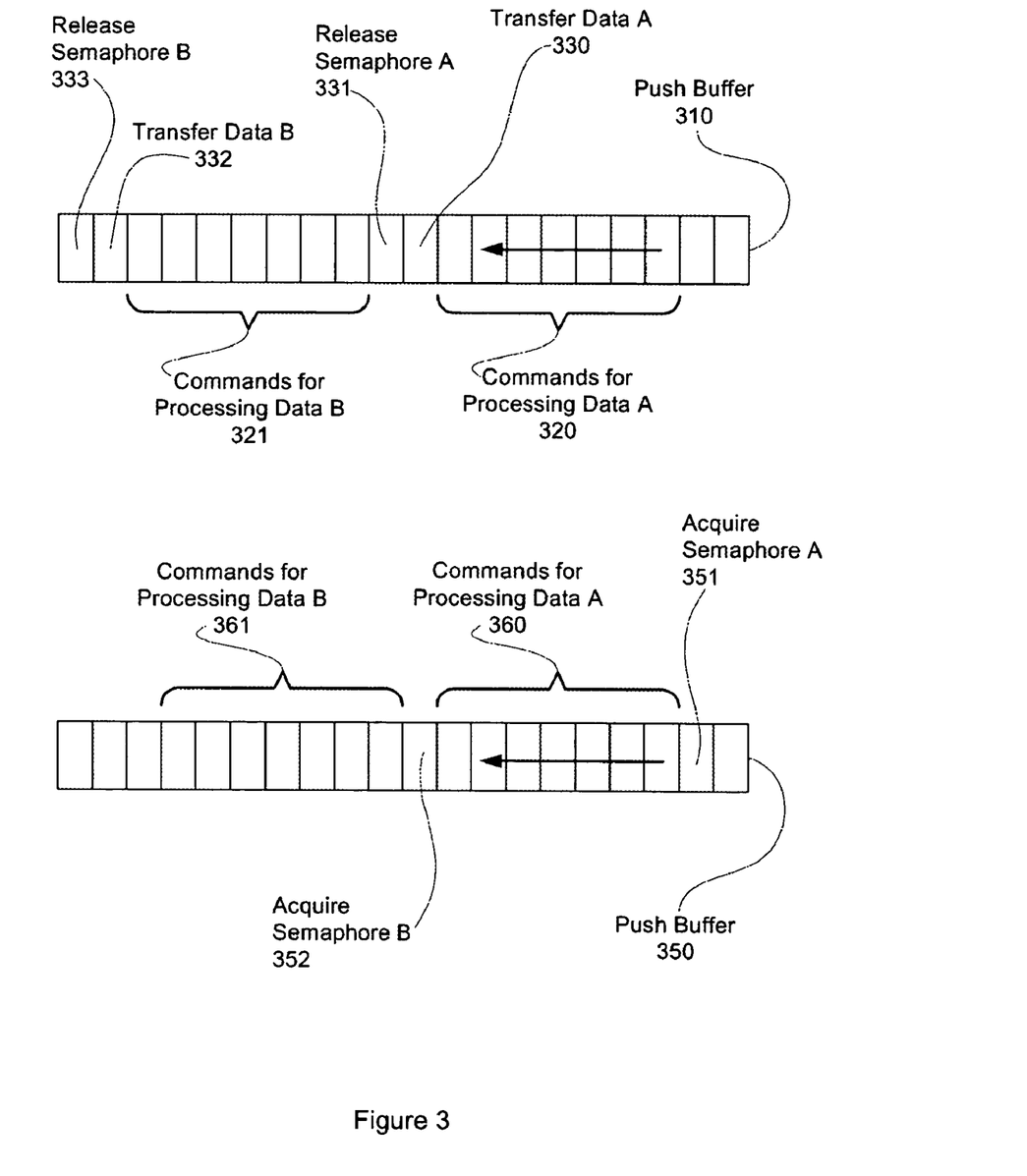
FIG. 3 is a conceptual drawing of two push buffers used to synchronize a data transfer from one API context to another API context, according to one embodiment of the invention.

FIG. 3 is a conceptual drawing of two push buffers used to synchronize a data transfer from one API context to another API context, according to one embodiment of the invention. Each of push buffers 310 and 350 have commands for directing GPU processing and semaphore commands for synchronizing source and destination GPU data transfers, enabling the processing of application data in two different API contexts.

A semaphore is a pointer to a specific address in memory. A semaphore may be released or acquired. When a GPU executes a release semaphore command, the GPU writes a specific value to the memory location associated with the semaphore. When a GPU executes an acquire semaphore command, the GPU reads the memory location associated with the semaphore and compares the value of that memory location with the value reflected in the acquire semaphore command. If the two values do not match, then the semaphore associated with the acquire semaphore command has not yet been released. In the case of a mismatch, the GPU executing the acquire semaphore command continues reading the memory location associated with the semaphore until a match is found. Consequently, the GPU executing the acquire semaphore command does not execute any additional push buffer commands until a match is found. For example, assume that a first GPU is directed to release a semaphore having a value of 99 and subsequently a second GPU is directed to acquire the semaphore having a value of 99. The second GPU will continue reading the memory location associated with the semaphore until that memory location has a value of 99. Importantly, the second GPU will not execute the next push buffer command until the memory location has a value of 99, and the memory will have a value of 99 only when the first GPU releases the semaphore having a value of 99.

Push buffer 310 is associated with a first API context that is a source of certain data to be transferred to a second API context. Commands for processing data A 320 are commands associated with a source process and may include, without limitation, commands necessary to process a frame of data, such as physics or geometric data, or to render a frame of graphics data. A transfer command, transfer data A 330, instructs the source GPU to transfer the processed data from a buffer within the first API context to a destination buffer within the second API context. After transferring the data, the source GPU executes a semaphore release command, release semaphore A 331, in order to synchronize the data transfer with a destination GPU. As described above, executing the semaphore release command causes the source GPU to release a semaphore.

Push buffer 350 is associated with the second API context of the data and includes commands for processing data A 360 that are executed on the destination GPU. However, before the destination GPU can process any of the commands for processing data A 360, the destination GPU first executes the acquire semaphore A 351 command. If successful, the acquire semaphore command A 351 results in the acquisition by the destination GPU of the semaphore released by the source GPU. Thus, successful acquisition of the semaphore indicates that the data transferred by the source GPU is available to the destination GPU for further processing. In this fashion, the data transfer between the first API context and the second API context is synchronized. Extending this example, the acquire semaphore B 352 command should succeed before the destination GPU may process the commands for processing data B 361, and so forth.

Referring back to the embodiment of FIG. 2B, when system memory is involved in context-to-context data transfers, the source GPU transfers the processed data within the source buffer to a designated buffer in the system memory in response to the transfer data A 330 command. After the transfer data command is completed, the release semaphore A 331 command is executed, as described above. The destination GPU then executes the acquire semaphore A 351 command. After acquiring the semaphore released by the source GPU, the destination GPU executes a "pull data" command (not shown), which causes the destination GPU to transfer the data in the designated system memory buffer to a destination buffer within the FB memory of the destination GPU. Once the data has been transferred to the destination frame buffer, the destination GPU is able to further process the data by executing one or more of the commands for processing data A 360. Thus, when transferring data through system memory, the push buffer 350 command stream should include a "pull data" command to be executed subsequent to each acquire semaphore command. In this fashion, data processed by the source GPU is known to be fully transferred from the source GPU and stable within the designated buffer within the system memory before being pulled into the FB memory by the destination GPU for further processing. Again, the data transfer between the first API context and the second API context is synchronized using release and acquire semaphore commands in the relevant push buffers.

Figure 4:
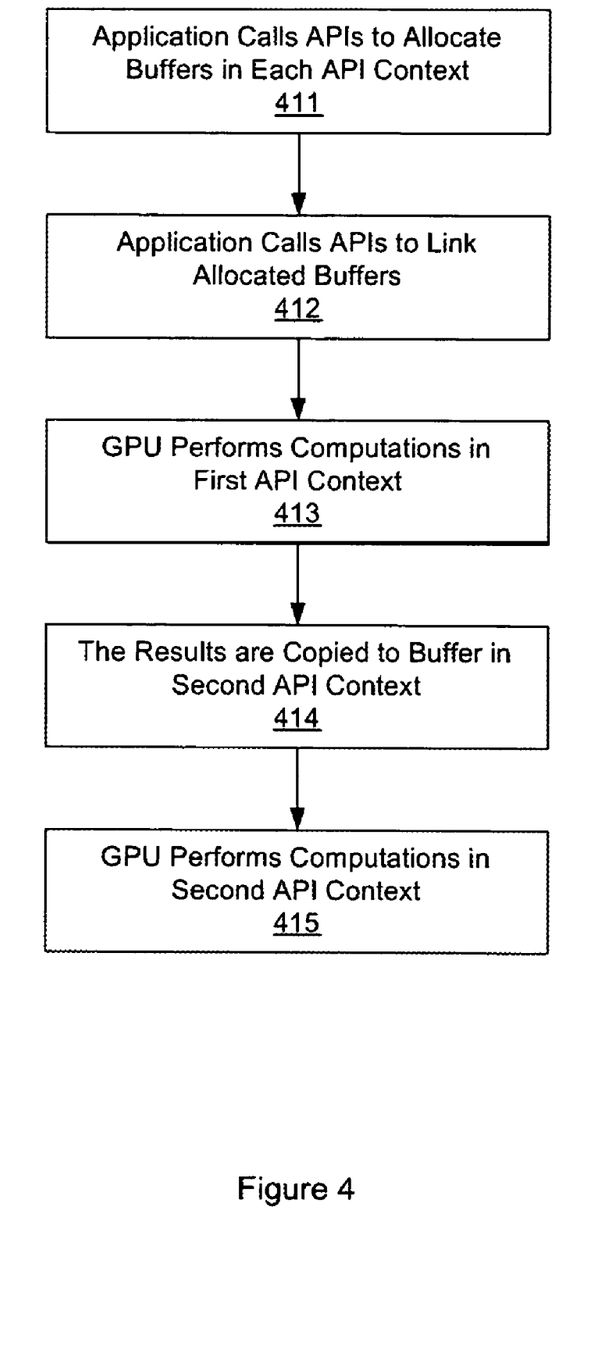
FIG. 4 is a flow diagram of a method for transferring data from one API context to another API context, according to one embodiment of the invention.

FIG. 4 is a flow diagram of a method for transferring data from one API context to another API context, according to one embodiment of the invention. Although the method steps are described in conjunction with FIGS. 1, 2A, 2B, 3 and 5, persons skilled in the art will understand that any system that performs the method steps, in any order, is within the scope of the invention.

The method of transferring data from one API context to another API context begins in step 411, where an application makes API calls to allocate buffers in each API context (e.g., buffers 225 and 245 of FIG. 2A). Any initialization unrelated to transferring data between API contexts is assumed to have occurred by this point in the execution of the application. The following pseudo-code illustrates the API calls that may be invoked by an application to allocate a buffer in an OpenGL® context and a D3D® context, where OpenGL® is used for physics or related computations and D3D® is used for rendering:

//allocate buffer for output of physics computation:
physicsBuffer=OGL_AllocateBuffer (width, height, . . . );
//allocate d3d texture that will receive a copy of physics computation
d3dTexture=D3D_CreateTexture (width, height, . . . );

After the buffers are allocated in step 411, the method proceeds to step 412, where the application makes API calls to link the source and destination buffers (e.g., buffers 225 and 245, respectively), as illustrated by the following pseudo-code:

//tell the d3d stack that this texture will be the target of P2P blit:

NvAPI_D3D9_OGLD3DSync_InitTexBuffer
(g_pd3dDevice, pD3DTextureA, . . . );
//link the two buffers together and store the offset of the destination texture:
gIOLGD3DSyncCopyBufferObject (physicsBuffer, d3dTexture.videoMemoryOffset);

After step 412, the method proceeds to step 413, where a GPU performs a first set of physics computations in the first API context, populating the previously allocated source buffer (e.g., buffer 225) with the resulting data from the computations. Once the first set of computations are complete in the first API context, for example when all physics computations are complete for a frame of graphics data, the method proceeds to step 414.

In step 414, the results from the first API context computation are transferred to the destination buffer (e.g., buffer 245) that is accessible to the second API context. In alternative embodiments, such as the embodiment of FIG. 2B, a buffer in system memory may act as an intermediate buffer before reaching the destination buffer. The use of semaphore commands in the relevant push buffers, as detailed in FIG. 3, ensures that the data processed within the first API context is completely transferred to the second API context before any processing on that data begins within the second API context.

In step 415, a second GPU performs computations on the data transferred to the second API context. For example, the second GPU may perform shading and rendering operations on the physics data computed previously by the first GPU.

In one embodiment of the invention, the destination buffer (e.g., buffer 245 of FIG. 2A) is a texture buffer. In alternative embodiments, however, the destination buffer may be any other technically feasible type of buffer, such as a vertex buffer.

Figure 5:
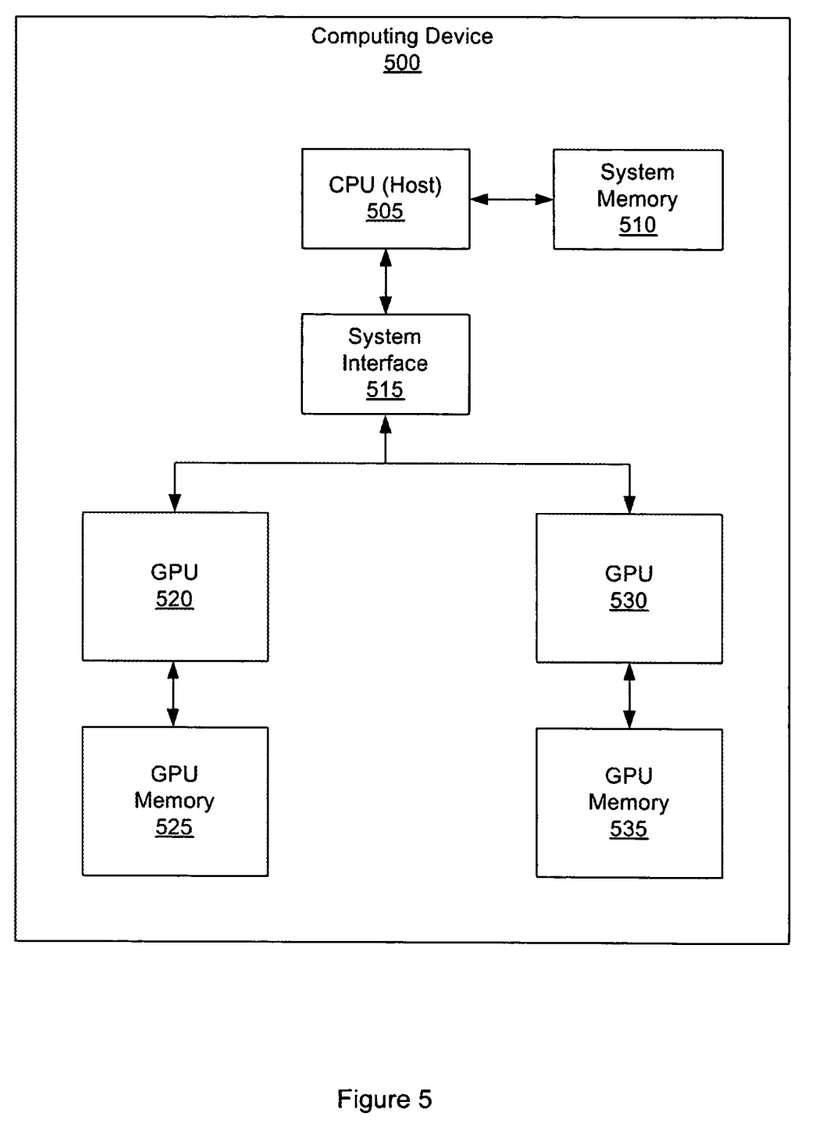
FIG. 5 is a conceptual diagram of a computing device configured to implement one of more aspects of the present invention.

FIG. 5 is a conceptual drawing of a computing device 100 configured to implement one or more aspects of the present invention. The computing device 500 includes, without limitation, a central processing unit (CPU) 505, system memory 510, a system interface 515, one or more graphics processing units (CPUs) 520, 530 with attached local memory 525, 535. The CPU 505 executes one or more software applications that may call upon one or more application programming interfaces to interact with one or more attached GPUs 520, 530, as described in FIGS. 2A-2B and 3, to process data on GPU 520 within a first API context and then on GPU 530 within a second API context. The system interface 515 provides a physical mechanism for the CPU 505 to communicate with attached GPUs 520, 530. PCI Express® (peripheral computer interface express) is a well-known example of such a system interface. Although computing device 500 is depicted with a set number of processors, persons skilled in the art will appreciate that the concepts of the present invention described herein apply with equal weight to systems having multiple CPUs and/or multiple GPUs.

While the forgoing is directed to embodiments of the present invention, other and further embodiments of the invention may be devised without departing from the basic scope thereof. For example, in an alternative embodiment, one GPU may operate under two different APIs, first processing data within a first API context under the first API, transferring the data to a second API context under the second API, and then processing the data within the second API context. In such an embodiment, both the source and destination buffers would reside within the local memory of the GPU, but the source buffer would be within the first API context and the destination buffer would be within the second API context. Thus the scope of the present invention is determined by the claims that follow.

We claim:

1. A system for processing data within multiple application programming interface (API) contexts, the system comprising:
  a system memory;
  a first API;
  a first software driver configured to:
    receive a first set of commands from an application via the first API,
    generate a first API context associated with the first API,
    generate a first push buffer of commands based on the first set of commands, wherein one or more commands in the first push buffer of commands and a first set of data are processed within the first API context to produce intermediate data, and
    generate a transfer command included in the first push buffer of commands;
  a second API that is unrelated to the first API; and
  a second software driver configured to:
    receive a second set of commands from the application via the second API,
    generate a second API context associated with the second API, and
    generate a second push buffer of commands based on the second set of commands, wherein one or more commands in the second push buffer of commands and the intermediate data are processed within the second API context to produce result data,
    wherein the transfer command, when processed within the first API context, causes the transfer of the intermediate data from an intermediate storage location for the first API context to an intermediate storage location for the second API context, each of the intermediate storage locations being part of a frame buffer memory that is separate from the system memory.

2. The system of claim 1, further comprising a graphics processing unit (GPU) coupled to a frame buffer memory that includes a first buffer and a second buffer.

3. The system of claim 2, wherein the GPU executes the first API context and the second API context, and the first set of data and the intermediate data are stored in the first buffer, and the result data is stored in the second buffer.

4. The system of claim 2, wherein the transfer command comprises a blit operation.

5. The system of claim 4, wherein the GPU releases a semaphore by executing a release semaphore command in the first push buffer of commands.

6. The system of claim 5, wherein the GPU acquires the semaphore by executing an acquire semaphore command in the second push buffer of commands.

7. The system of claim 1, further comprising a first GPU coupled to a first frame buffer memory that includes a first buffer and a second GPU coupled to a second frame buffer memory that includes a second buffer.

8. The system of claim 7, wherein the first GPU executes the first API context and the second GPU executes the second API context.

9. The system of claim 8, wherein the first GPU transfers the intermediate data from the first API context to the system memory by executing the transfer command in the first push buffer of commands and releases a semaphore by executing a release semaphore command in the first push buffer of commands, and the second GPU acquires the semaphore by executing an acquire semaphore command in the second push buffer of commands and pulls the intermediate data from the first API context from the system memory into the second buffer by executing a pull data command in the second push buffer of commands.

10. The system of claim 8, wherein the transfer comprises a blit operation.

11. The system of claim 8, wherein the first GPU releases a semaphore by executing a release semaphore command in the first push buffer of commands.

12. The system of claim 11, wherein the second GPU acquires the semaphore by executing an acquire semaphore command in the second push buffer of commands.

13. The system of claim 12, wherein the second GPU further processes the intermediate data by executing one or more commands in the second push buffer of commands.

14. The system of claim 1, wherein the transfer of the intermediate data from the intermediate storage location for the first API context to the intermediate storage location for the second API context is trigged by the first software driver that is configured to push the intermediate data to the intermediate storage location for the second API context.

15. A computing device configured to process data in multiple application programming interface (API) contexts, the computing device comprising:
   a central processing unit (CPU);
   a system memory;
   a first graphics processing unit (GPU) coupled to the CPU;
   a second GPU coupled to the CPU;
   a first API;
   a first software driver configured to:
      receive a first set of commands from an application via the first API,
      generate a first API context associated with the first API,
      generate a first push buffer of commands based on the first set of commands, wherein one or more commands in the first push buffer of commands and a first set of data are processed within the first API context to produce intermediate data, and
      generate a transfer command included in the first push buffer of commands;
   a second API that is unrelated to the first API; and
   a second software driver configured to:
      receive a second set of commands from the application via the second API, and
      generate a second API context associated with the second API, generate a second push buffer of commands based on the second set of commands, wherein one or more commands in the second push buffer of commands and the intermediate data are processed within the second API context to produce result data,
   wherein the transfer command, when processed within the first API context, causes the transfer of the intermediate data from an intermediate storage location for the first API context to an intermediate storage location for the second API context, each of the intermediate storage locations being part of a frame buffer memory that is separate from the system memory.

16. The computing device of claim 15, wherein the transfer of the intermediate data from the intermediate storage location for the first API context to the intermediate storage location for the second API context is trigged by the first software driver that is configured to push the intermediate data to the intermediate storage location for the second API context.

* * * * *